US007133386B2

(12) United States Patent
Holur et al.

(10) Patent No.: US 7,133,386 B2
(45) Date of Patent: Nov. 7, 2006

(54) METHOD AND SYSTEM FOR SERVICE PORTABILITY ACROSS DISJOINT WIRELESS NETWORKS

(75) Inventors: Balaji S. Holur, Plano, TX (US); Michael L. Shannon, San Jose, CA (US); Kenneth W. Davidson, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 10/299,356

(22) Filed: Nov. 18, 2002

(65) Prior Publication Data

US 2004/0120277 A1 Jun. 24, 2004

(51) Int. Cl.
*H04Q 7/00* (2006.01)
*H04Q 7/24* (2006.01)
*H04Q 7/20* (2006.01)
*H04L 12/28* (2006.01)

(52) U.S. Cl. ............... 370/331; 370/328; 370/338; 370/401; 455/436; 455/444; 455/433

(58) Field of Classification Search ........... 370/310, 370/328, 331, 335, 338; 455/422.1, 432.1, 455/432.2, 432.3, 435.1, 436, 444
See application file for complete search history.

(56) References Cited

U.S. PATENT DOCUMENTS

| 6,009,088 | A  | 12/1999 | Taguchi et al. | 370/338 |
|---|---|---|---|---|
| 6,246,886 | B1 | 6/2001 | Oliva | 455/553 |
| 6,327,470 | B1 | 12/2001 | Ostling | 455/437 |
| 6,418,138 | B1 | 7/2002 | Cerf et al. | 370/352 |
| 6,453,171 | B1 | 9/2002 | Auvray | 455/552 |
| 6,466,556 | B1 | 10/2002 | Boudreaux | 370/331 |
| 6,519,266 | B1 | 2/2003 | Manning et al. | 370/469 |
| 6,580,921 | B1 | 6/2003 | Inoue et al. | 455/552 |
| 6,587,457 | B1 | 7/2003 | Mikkonen | 370/356 |
| 6,665,537 | B1 | 12/2003 | Lioy | 455/435 |
| 2002/0023162 | A1 | 2/2002 | Ahn et al. | 709/230 |
| 2002/0067707 | A1* | 6/2002 | Morales et al. | 455/436 |
| 2002/0085516 | A1 | 7/2002 | Bridgelall | 370/329 |
| 2002/0147008 | A1 | 10/2002 | Kallio | 455/426 |
| 2002/0154627 | A1* | 10/2002 | Abrol et al. | 370/338 |
| 2002/0191572 | A1* | 12/2002 | Weinstein et al. | 370/338 |
| 2002/0191575 | A1* | 12/2002 | Kalavade et al. | 370/338 |

(Continued)

FOREIGN PATENT DOCUMENTS

EP 0 766 427 A2 4/1997

(Continued)

OTHER PUBLICATIONS

Jang Dynamic WWAN and WLAN intreface and system, May 28, 2002, U.S. Appl. No. 60/383,938 , 1-35.*

(Continued)

*Primary Examiner*—Steven Nguyen
(74) *Attorney, Agent, or Firm*—Baker Botts L.L.P.

(57) ABSTRACT

A method and system for providing services to a communication session anchored to a micro wireless network includes providing at a router of the micro wireless network an interface for communication with a service node of a macro wireless network that is coupled to the micro wireless network. The interface is of a same type as used by a radio access network of the macro wireless network to communicate with the service node. Information associated with the session is communicated between the interface and the service node in a format used by the service node to communicate with the radio access network of the macro wireless network. The macro network provides portability services to the session of the micro wireless network through the interface.

20 Claims, 2 Drawing Sheets

U.S. PATENT DOCUMENTS

| | | | |
|---|---|---|---|
| 2003/0185161 A1* | 10/2003 | Harris et al. | 370/310 |
| 2004/0001468 A1* | 1/2004 | Bichot et al. | 370/338 |
| 2004/0008645 A1* | 1/2004 | Janevski et al. | 370/331 |
| 2004/0028081 A1* | 2/2004 | Chang et al. | 370/490 |
| 2004/0029585 A1* | 2/2004 | Akgun et al. | 455/432.2 |
| 2004/0114553 A1* | 6/2004 | Jiang et al. | 370/328 |
| 2004/0203792 A1* | 10/2004 | Shaheen et al. | 455/444 |
| 2005/0154909 A1* | 7/2005 | Zhang et al. | 713/200 |

FOREIGN PATENT DOCUMENTS

| | | |
|---|---|---|
| EP | 0 877 532 A2 | 3/1998 |
| EP | 1 207 708 A1 | 5/2002 |
| WO | WO 01/89251 A1 | 11/2001 |
| WO | WO 02/103970 A1 | 12/2002 |

OTHER PUBLICATIONS

Apostolis K. Sankinzis, WLAN-GPRS intergation for next generation mobile data networks, Oct. 2002, IEEE, pp. 112-124.*

S. Ghaheri Niri et al., "Wide Area Mobility of DECT," *Global Telecommunications Conference*, 1996, 7 pages.

PCT Invitation to Pay Additional Fees in PCT International Application No. PCT/US 03/34364, dated Apr. 15, 2004, 5 pages.

Notification of Transmittal of the International Search Report or the Declaration (PCT Rule 44.1) mailed Sep. 9, 2004 (10 pages) re International Application No. PCT/US 03/34364 (filed Oct. 29, 2003).

Janise McNair et al., "Handoff Rerouting Scheme for Multimedia Connections in ATM-Based Mobile Networks," Vehicular Technology Conference 2000, vol. 2, Sep. 24, 2000, pp. 630-637, XP010525459.

* cited by examiner

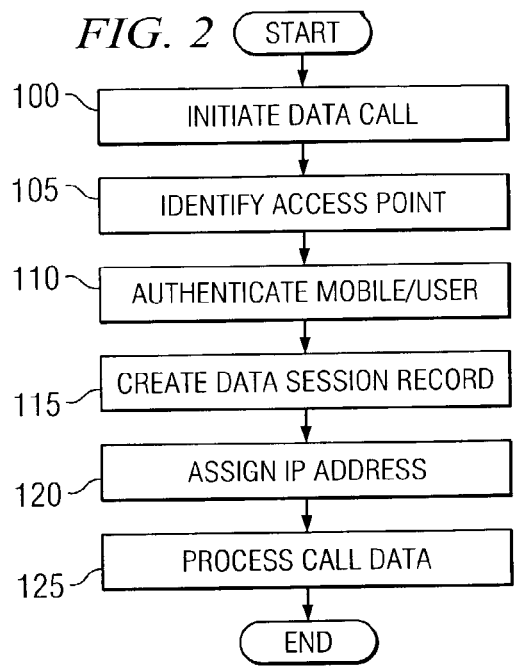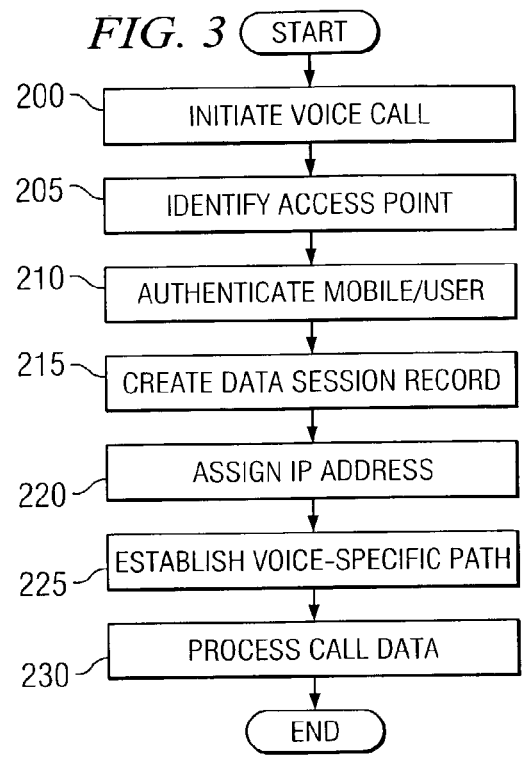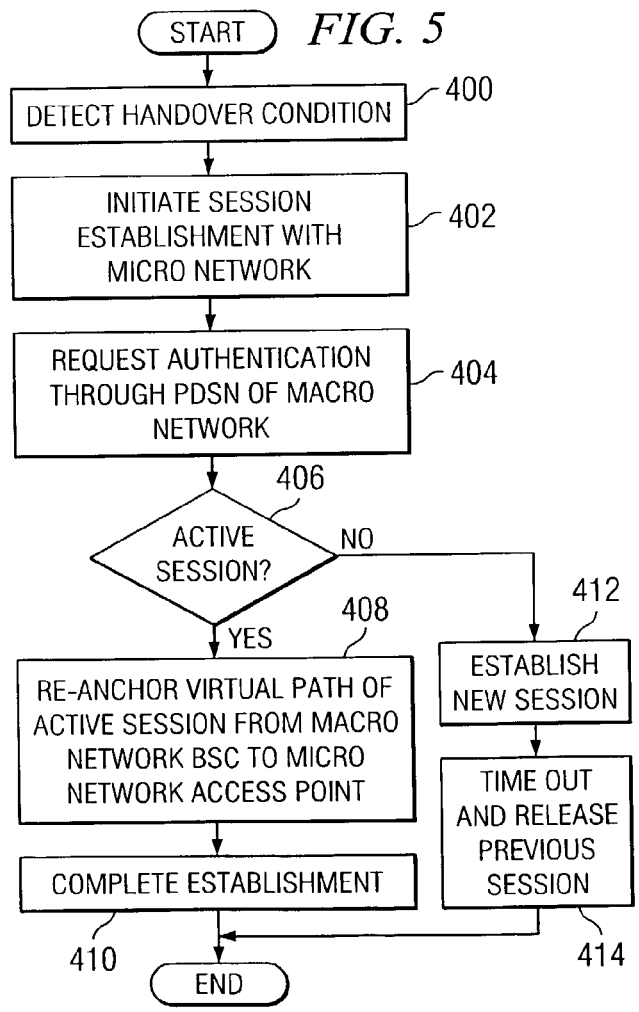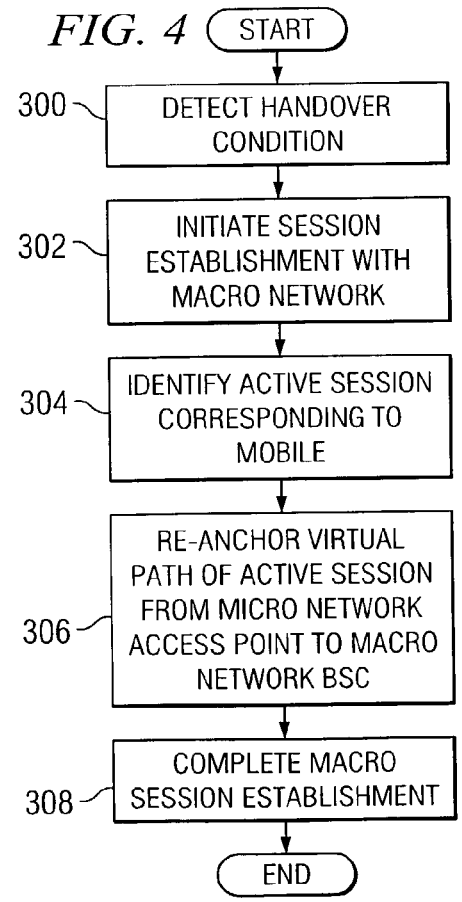

METHOD AND SYSTEM FOR SERVICE PORTABILITY ACROSS DISJOINT WIRELESS NETWORKS

TECHNICAL FIELD

This invention relates generally to the field of wireless communications and, more particularly, to a method and system for service portability across disjoint wireless networks.

BACKGROUND

Traditional macro wireless networks such as code division multiple access (CDMA) networks include a number of base transceiver stations (BTSs), mobile switching centers (MSCs) and base station controllers (BSCs). The BTSs each cover a geographic region, or cell, of the wireless network and communicate with mobile telephones in the cell. The MSCs/BSCs provide switch and soft handoff functionality for the wireless network.

Micro wireless networks, such as wireless local access networks (WLANs), typically include a number of access points (similar to macro base stations) and several IP routing devices. The access points each cover a geographic region of the WLAN and communicate with mobile devices in the local network. The IP routing devices provide connectivity to an IP network, and manage the mobility of the micro devices within a micro network.

Mobile vendors offer dual mode phones capable of communicating with both macro and micro networks. Current proposals to provide service portability for such devices across the macro and micro networks include running Mobile IP applications on end devices, running Proxy Mobile IP applications on access points or other devices, treating the WLAN cells as disjoint cells with respect to the macro cells.

SUMMARY

A method and system for service portability across disjointed wireless networks is provided. In a particular embodiment, a micro wireless network is coupled to a macro wireless network and communicates with a service node of the macro wireless network through an interface of the same type as used by a radio access network within the macro network to communicate with the service node.

In accordance with one embodiment of the present invention, a method and system for providing services to a communication session anchored to a micro wireless network includes providing at a router of the micro wireless network an interface for communication with a packet data service node of a macro wireless network that is coupled to the micro wireless network. The interface is of a same type as used by a radio access network of the macro wireless network to communicate with the packet data service node. Information associated with the session is communicated between the interface and the packet data service node in a format used by the service node to communicate with the radio access network of the macro wireless network. The macro network provides macro network services to the session of the micro wireless network through this interface.

Technical advantages of one or more embodiments of the invention include providing macro wireless network services to micro network sessions. In a particular embodiment, all or substantially all of the internet protocol (IP) services defined for the macro network may be used for a wireless local access network such as traffic shaping, location services, prepaid billing, differential billing through the use of the macro infrastructure. Thus network operators may provide enhanced services, therefore generating increased revenue, based on new services.

Other technical advantages may include allowing mobile users to seamlessly or otherwise move between micro and macro network access technologies such as the 802.11 standard and code division multiple access (CDMA) standard. Still another technical advantage may include providing traffic shaping or flow control, of various users under a wireless local access network (WLAN) standard, without requiring revision of the WLAN standard. Another technical advantage may include providing user authentication and verification in conjunction with the WLAN standards and interfaces. Still another technical advantage may include providing mobile IP applications operable to be engaged during handover or cross access technologies.

Yet other technical advantages may include managing the traffic in the public wireless WLAN networks without disturbing the currently deployed networks. Moreover simplified billing and authenticated procedures stemming from a single data based management for user services and associated definitions may also be achieved. In addition, simple IP, mobile IP and proxy mobile IP may be used without having to depend on the end devices carrying the mobile IP application or access points carrying proxy mobile IP applications.

Other technical advantages will be readily apparent to one skilled in the art from the following figures, descriptions, and claims. Moreover, some, all, or none of the above technical advantages may be included in the various embodiments of the present invention.

BRIEF DESCRIPTION

For a more complete understanding of the present invention and its advantages, reference is now made to the following description, taken in conjunction with the accompanying drawings, wherein like numerals represent like parts, in which:

FIG. 2 is a flow diagram illustrating a method for processing a data call in the micro network of FIG. 1 through a macro network in accordance with one embodiment of the present invention;

FIG. 3 is a flow diagram illustrating a method for processing a voice call in a micro network of FIG. 1 in accordance with another embodiment of the present invention;

FIG. 4 is a flow diagram illustrating a method for handover of a session from the micro network to the macro network in accordance with another embodiment of the present invention; and FIG. 5 is a flow diagram illustrating a method for handover of a session from the macro network to the micro network in accordance with one embodiment of the present invention.

DETAILED DESCRIPTION

Figure 1:
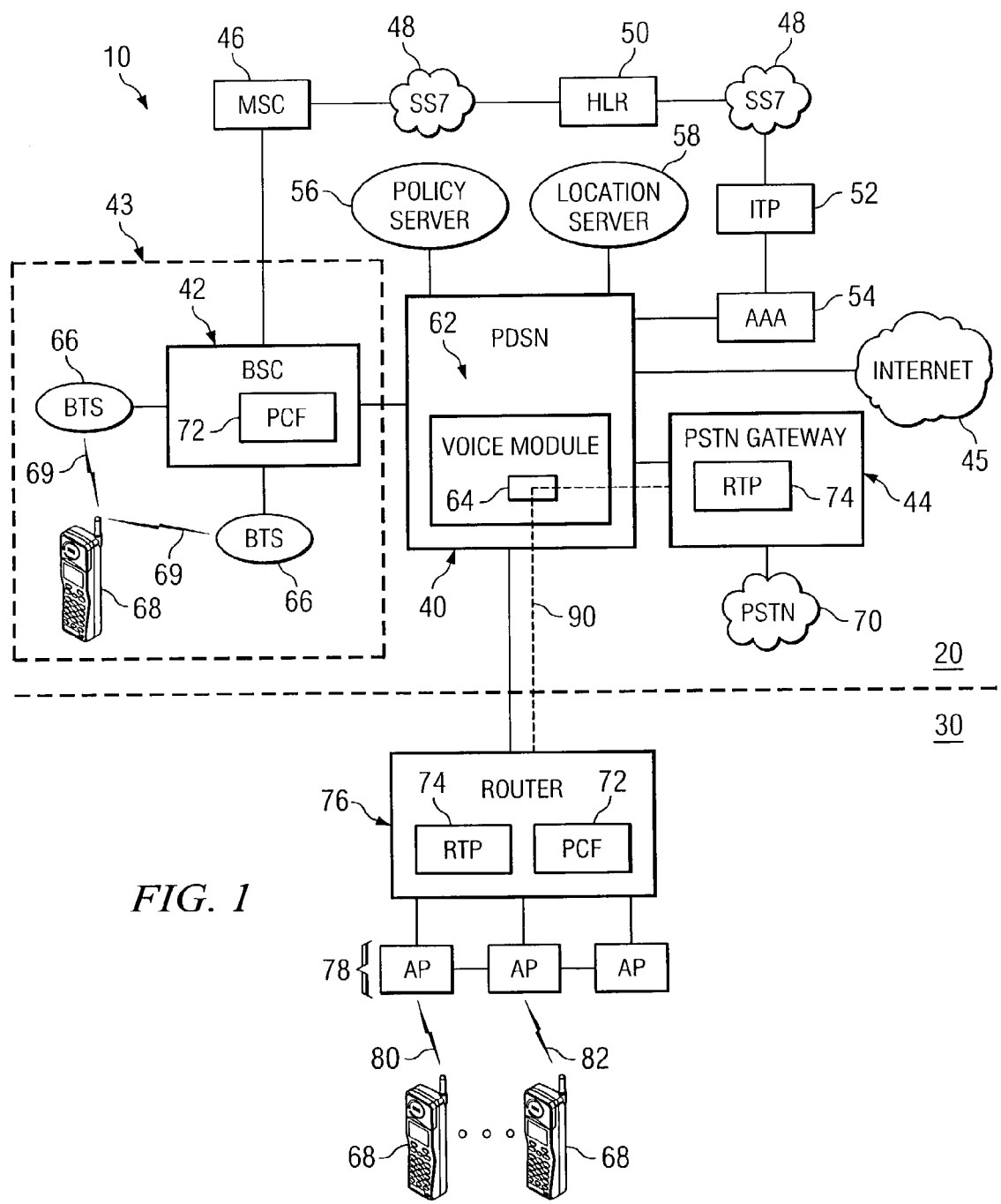
FIG. 1 is a block diagram illustrating coupled macro and micro wireless communication networks in accordance with one embodiment of the present invention.

FIG. 1 is a block diagram illustrating a communication system 10 in accordance with one embodiment of the present invention. Communication system 10 may transmit voice, audio, video, text, data and/or other types of information from one point to another. Communication system 10 includes a macro wireless network 20 and a micro wireless network 30. The macro wireless network 20 includes a wide transmitter range of terminals based on a large number of transmitter/receiver devices on the infrastructure side. Transceivers of the macro wireless network 20 are scattered over an area to cover a fairly reasonable or large size geographic zone. The micro wireless network 30 includes smaller geographic coverage areas focused on high-density customers. For example, the micro network may cover an airport, corporate facility or campus or transport hub. As described in more detail below, the macro and micro networks 20 and 30 are loosely coupled to each other to provide service portability are portable between the networks and to allow traffic may be exchanged by the networks.

Macro network 20 may be a code division multiple access (CDMA) or other suitable network. For example, the macro network 20 may be an IS-95 CDMA network, W-CDMA network, CDMA-2000 network or other network such as a universal mobile telecommunication system (UMTS) network. In the CDMA embodiment, the macro network 20 may include a packet data serving node (PDSN) 40 coupling one or more base station controllers (BSC) 42 of one or more radio access networks (RAN) 43 to a public switched telephone network (PSTN) gateway 44 and to an internet protocol (IP) or other packet network such as the internet 45. RAN 43 provides an interface between transceiver stations and the communication network of the macro wireless network 20 to support voice and data communication.

The PDSN 40 and BSC 42 are also coupled to a core control network that performs authentication and sets up and disconnects calls from mobile units, or nodes, in communication with the RAN 43. The core network also stores service level agreements for each user and provides the agreements to the PDSN 40 for service management, traffic management or other appropriate operations.

In one embodiment, the core control network may include a mobile switching center (MSC) 46 coupled to BSC 42. MSC 46 is also coupled to a control plane signaling system 7 (SS7) gateway 48, which is coupled to a home location register (HLR) 50. HLR 50 is coupled through an SS7 48 to an IP/TP protocol converter (ITP) 52. ITP 52 is coupled to a billing authentication, administration, and accounting server (AAA) 54. PDSN 40 is also coupled to AAA 54; and may communicate using the Radius protocol. The core control network may further include a policy server 56 and a location server 58 coupled to PDSN 40.

MSC 46 is operable to provide, in conjunction with the BSC 42, switch and handoff functionality for a macro network 20. In this way, voice, video, data text and other information is routed to and from a mobile node and connections are maintained with a mobile node as it moves between the cells of the RAN 43. In a particular embodiment, MSC 46 may communicate with PDSN 40 via BSC 42 using a wireless-specific interface. A wireless-specific interface is an interface or protocol especially adapted for radio frequency or mobile traffic or signaling and not typically used by wire line networks. MSC 46 may communicate with PDSN 40 using media gateway control protocol (MGCP)/ common open policy server (COPS) protocols.

HLR 50 provides a subscriber database storing information related to the mobile nodes and/or users, such as by name, address, account number, account type and any other suitable information. HLR 50 includes subscriber information for users of the macro network 20 as well as for users of the micro network 30. AAA server 54 provides reconciliation between different systems. Policy server 56 includes functionality operable to access user subscriber information for the purpose of assigning network resources in accordance with the user's subscription level as well as a network hierarchy of resource allocation in the absence of or in conjunction with subscriber based policy determinations. Location server 58 comprises functionality operable to determine a location of a mobile device and may facilitate advertising to application based servers.

PDSN 40 is a router that directs traffic in a bearer plane between wireless and wire line networks. PDSN 40 may also include a data inter-working function (IWF) to provide connectivity between a wireless and wire line network via either circuit switched and/or packet switched wireless data protocols. PDSN 40 may further include such router services as simple internet protocol (IP), mobile IP, and proxy mobile IP to support service portability between a wireless local access network (WLAN) and a macro network. Such router services, in connection with the coupling of the networks allow, in one embodiment, pre-paid billing, data push services, traffic management, and schemas defined for the macro network 20 to be reused for the micro network 30. Moreover, in a particular embodiment, existing mobile devices may gain access to macro services from the micro network 30 without requiring the associated mobile IP applications running in the mobile node, or end device.

To support voice calls from the micro network 30, PDSN 40 also includes voice module 62 and vocoding functions 64. Voice module 62 is operable to couple a micro network router to the PSTN gateway 44 through a real-time protocol (RTP) connection. In particular, the voice module 62 may instruct the router 76 of the micro network 30 to establish RTP streaming pipes 90 to the PSTN gateway 44 for voice traffic. The voice module 62 also connects incoming voice traffic to vocoder 64. Vocoder 64 is operable to convert incoming voice traffic from a mobile node compression format such as QCELP to a compression format used by the network, such as G.2xx or G.7xx. Other suitable compression formats may be used.

RAN 43 includes the one or more BSCs 42 each coupled to one or more base transceiver stations (BTS) 66. As used herein, the term "each" means every one of at least a subset of the identified items. The BTSs 66 communicate with mobile nodes 68 in associated cells over a radio frequency (RF) link 69. The BSCs 42 each include a packet control function (PCF) 72 which shapes and otherwise controls packets transmitted between BSC 42 and PDSN 40. The PCF 72 tunnels IP packets between the RAN 43 and the PDSN 40. The PCF 72 communicates with the PDSN 40 through a well known standard interface called Radio-PDSN interface (RP interface). PCF's 72 primary responsibility is to provide logical connectivity between the BSC 42 and the PDSN router 40 for the purpose of IP services. PCF 72 utilizes the standard RP interface functions for the purpose of establishing logical connectivity between the mobile sessions with the PDSN 40.

PSTN gateway 44 is coupled to the public switched telephone network (PSTN) 70. PSTN gateway 44 includes RTP 74 to support voice sessions, or calls, with mobile nodes 68 of the micro network 30.

Micro network 30 includes router 76 coupling a plurality of access, or hot, points 78 to the macro network 20. Access points 78 may comprise micro base stations that communicate with mobile nodes 68 over RF link 80. In one embodiment, the RF link 80 may be an 802.11b protocol link. In this embodiment, the wireless nodes 68 may include an access card for accessing the access points 78.

The router 76 includes PCF 72 and RTP 74. PCF 72 provides a packet interface for communicating data and other information with PDSN 40 and may provide the same functionality in router 76 as it does in BSC 42. PCF 72 communicates, in one embodiment, IP packets over an RP protocol, or pipe. The IP packets may be encapsulated using general routing and encapsulation (GRE) protocol. Because router 76 uses an interface similar or identical to that of the BSC 42, the PDSN 40 need not be reconfigured to communicate with the router 76 of the micro network 30. As in the BSC 42, the PCF 72 of the router 74 provides traffic shaping and other packet control functionality. In addition, registration in the macro and micro networks 20 and 30 is the same as is communication between the mobile node 68 and PDSN 40.

Use of a standardized or other macro network serving node interference in the micro network 30 provides a loose couple of the networks, allows location based services, push services, dynamic mapping with control, differentiated billing and other macro network 20 services to be provided in the micro network 30. It also allows a single place holder for a user profile and user services definition, ability for the service provider to own the WLAN or work with other WLAN vendors, and the ability to map cellular RF behavior to IP behavior. Moreover, advantages to the service provider include providing an integrated network to support both macro and micro networks with access independence and service portability as well as seamless handover. Access independence is provided by the standardized PCF 72 interface in the micro network 30, push services are provided based on the common registration scheme in the macro and micro networks 20 and 30 and location services are based on information provided by the mobile node 68 to the PDSN 40 from both networks 20 and 30. In addition, because subscribers may be seamlessly or otherwise offloaded from the macro network 20 to the micro network 30, resources of the macro network 20 may be spread across an increased number of subscribers.

In the macro and micro networks 20 and 30, the mobile nodes 68 may be any device operable to provide wireless communication with the macro and/or micro networks 20 and 30. In one embodiment, the mobile nodes 68 are dual mode devices with a macro mode for communicating with a macro network 20 and a micro mode for communicating with micro network 30.

In the macro and micro networks 20 and 30, PDSN 40, BSC 42, MSC 46, SS7 48, HLR 50, ITP 52, AAA 54, PSTN gateway 44, router 76 and other components may be implemented as functional instructions, code, or other logic encoded media. The logic encoded media may comprise software stored on a computer-readable medium as well as programmed application-specific integrated circuits (ASIC), field programmable gate arrays (FPGA) or other programmed hardware. The media may comprise different mediums and may be distributed across a plurality of platforms and/or centralized.

Components of the micro and macro networks 20 and 30 may be connected or otherwise coupled to each other with any suitable type of communication links supporting information transfer. In one embodiment, communication links may be, alone or in combination, integrated services digital network (ISDN) links, asymmetric digital subscriber line (ADSL) links, T1 or T3 communication lines, hard-wire lines, telephone lines or wireless communication links. Other suitable links may be used. Communication links may also connect a plurality of intermediate servers and components of the system 10.

For data session from the micro network 30, in a particular embodiment, an AAA proxy is run in PDSN 40 of the macro network 20. Data and voice and other session may be conventionally processed. The access points 78 have configured IP addresses of the AAA proxy running in the PSDN so that AAA commands may be routed during user authentication. The access points 78 of the micro network 30 send L2 authentication packets to the AAA proxy running in the PSDN 40. When the AAA proxy receives AAA commands, the AAA proxy may retrieve the subscriber information from the AAA server 54. In particular, during access authentication, a radius access request is proxied by the PDSN 40 to the AAA server. The request may also be proxied through the IP network 45. Thus, the PDSN 40 extracts the mobile node identifier (MNID), and sends RADIS access queries to the AAA server 54, which in turn communicates with the HLR server 50 to retrieve the user subscriber profile. Then, the AAA proxy in the PDSN 40 may decide based on the returned information that the requested call/subscriber be treated as a Direct Access call or a Proxy Mobile IP subscriber.

For a Direct Access Call the AAA proxy may create a data session record in the PDSN 40 corresponding to the data session record for the wireless local access network. As described below, the data session record may store the IP address allocated to a specific data session. The data session record may also identify the PDSN 40 handling the call.

After authentication, the mobile node, or access client, may use the normal dynamic host configuration protocol (DHCP) mechanism to receive the IP address. The DHCP messages may be similarly proxied by PDSN 40. The IP address assigned may then be stored in the data session record.

If the AAA proxy, based on the subscriber information, detects that the subscriber should be treated as a proxy mobile IP subscriber, the AAA proxy may trigger the proxy mobile IP application to establish a mobile IP session with a home agent located in the core control network. In this case, the home agent assigns the IP address to be stored in the data session record. Thus, when the access client uses the normal DHCP mechanism to receive an IP address, the DHCP proxy retrieves the IP address from the data session by the home agent, and allocates the IP address to the access client. Thus, in this embodiment, the WLAN network 30 appears as a CDMA cell to the macro network 20. At the end of a session, PDSN 40 provides session information to the billing server for reconciliation. Thus, separator billing servers for the macro and micro networks 20 and 30 are not needed.

Transparency of the WLAN network 30 supports service portability between the networks 20 and 30 and handoffs between the networks. In one instance, a call may be originated from the micro network 30 and require handover to a macro (CDMA) cell. In this case, when the mobile node 68 detects that a handover is required, normal traffic channel establishment procedures are initiated. During the traffic channel establishment procedures, when the PCF 72 in the BSC 42 attempts to establish an RP session with the PDSN 40, the PDSN 40 recognizes that a data session record corresponding to the MNID of the mobile unit 68 already exists, was created earlier when the mobile node 68 was authenticated and was given data services and an IP address. The PDSN 40 then continues with normal macro session established procedures. However, because the IP address assigned to the mobile device 68 is a valid one, during the internet protocol control protocol (IPCP) negotiation the mobile node 68 does not receive a new IP address. Thus, only the logical link between the PDSN 40, PCF 72 and the mobile node 68 need be and is modified. If the WLAN mobile node 68 uses PPP in lieu of DHCP, PSDN 40 redirects the PPP packets to the new virtual link created with the mobile station 68 via the PCF RP interface.

A call originated from a macro (CDMA) cell may also be seamlessly or otherwise handed over to a micro cell (WLAN). When the call is originated from a macro cell, PDSN 40 uses the normal data session establishment procedures depending on the call type, e.g., simple IP, proxy mobile IP, or mobile IP procedures. When the mobile node 68 decides to handover from the macro cell to a micro (WLAN) cell, the standard L2 authentication is triggered via the access points 78. When the access points 78 forward the authentication (AAA) commands to the same PDSN from which the data call is currently anchored, the AAA commands check with the PDSN 40 to see if a session already exists corresponding to the MNID of the mobile station 68. If a session already exists, only the virtual path via the BSC 42 needs to be and is re-anchored to be routed via the new access points 78.

If, however, the access point 78 is associated with a new PDSN 40, when the AAA commands are received to establish a connection, the request is treated a new request to establish a data session. The connection to the old PDSN 40 may then be timed out and released. If the new PDSN 40 is part of a PDSN cluster, and the mobile node 68 previously established a connection with another PDSN 40 in the same cluster, the cluster manager may route the request to the previous PDSN 40 to accomplish the macro-to-micro handoff.

FIG. 2 illustrates a method for processing a data session from the micro network 30 through the macro network 20 in accordance with one embodiment of the present invention. In this embodiment, the data session is processed through PCF 72 of router 76 in the micro wireless network 30. PCF 72 uses RP to establish a session between PCF 72 and PDSN 40 and communicates IP packets to PDSN 40 using GRE protocol and through an RP pipe.

The method begins at step 100 wherein the data session is initiated in the micro network 30. In one embodiment, the session, or call, is initiated by a mobile node 68. Next at step 105, an access point 78 of a micro network 20 with which the mobile node 68 is communicating is identified. In one embodiment an access point 78 is identified and associated with the initiated data call.

Next at step 110 the device and/or user initiating the data call is authenticated. In one embodiment, access point 78 communicates with a router 76, which in turn communicates with PCF 72 to access the AAA proxy of PDSN 40 in the macro network 20. Next at step 115, after the authentication, a data session record is created. In one embodiment, this step is preformed by PDSN 40 of macro network 20.

At step 120 an IP address is assigned to the mobile node and/or user initiating the data call. In one embodiment this step is performed by PDSN 40. The assigned IP address is recorded in the data session record created at step 115. In one embodiment storing the IP address in the data session record is performed by PDSN 40 of macro network 20.

At step 125 the call data is processed in accordance with the identified access point 78 and the assigned IP address. The process continues until ordinary call termination and the process ends. During the call, location based services, pushed services, dynamic mapping, differentiated billing as well as other macro network services may be provided for the data call by the macro network 20. In addition, the PDSN 40 of the macro network 20 may in connection with the PCF 72 in the router 76 of micro network 30 mark and shape traffic to provide traffic management and bandwidth control.

FIG. 3 illustrates a method for processing a voice call in a micro wireless network 30 in accordance with one embodiment of the present invention. In this embodiment, as described in connection with FIGS. 1 and 2, the micro wireless network 30 communicates with PDSN 40 of the macro wireless network 20 through PCF 72 in router 76. PCF 72 communicates with PDSN 40 using, in one embodiment, GRE protocol and an RP session between PCF 72 and PDSN 40. The method begins at step 200 wherein a voice call is initiated in the micro network 30. Next at step 205 an access point 78 associated with the mobile node 68 initiating a voice call is identified. In one embodiment, this may be at access point 78 of the micro network 30.

Next at step 210 the mobile node and/or user initiating the voice call is authenticated. In one embodiment, the access point 78 communicates with the mobile device 68 and the PCF gateway 72 of router 76 to communicate with the AAA proxy of PSDN 40.

Next, at step 215, upon authentication a data session record is created. In one embodiment, this step is performed by PDSN 40 of macro network 20. Next at step 220 an IP address is assigned to the device/user initiating the voice call.

Next at step 225 a voice-specific path is established. In one embodiment, the voice-specific path is established via access point 78 through RTP 74 and PCF 72 of router 76 and then through the voice module 62 of PDSN 40 of macro network 20, and therefrom to the RTP 74 of PSDN gateway 44 of the macro network 20.

At step 230 voice traffic is processed in accordance with the established voice-specific path, assigned IP address, associated access points 78 as well as protocols and operation in the micro network 30. In one embodiment, voice traffic from the mobile node is converted from a mobile node format for RF communications to a network format for communication in a wired network. Call processing proceeds as normal until the call ends and the process ends. During data, voice and other calls handoff to the macro network 20 may occur as described in more detail below.

FIG. 4 illustrates a method for handoff, or handover, of a call session from a micro network 30 to the macro network 20 in accordance with one embodiment of the invention. In this embodiment, both the RAN 43 and the micro network 30 use PCF 72 to communicate with PDSN 40. The RAN 43 and micro network 30 may use other suitable interfaces to communicate with PDSN 40 or other suitable service node without departing from the scope of the present invention.

Referring to FIG. 4, the method begins at step 300 in which mobile node 68 detects a handover condition. In one embodiment, the mobile node 68 may detect a handover condition when its signal strength to the micro network is outside of a specified limit and/or signal strength with a BTS 66 of the macro network 20 is within a specified limit. Next, at step 305, the mobile node 68 initiates traffic channel establishment with the macro network 20.

Proceeding to step 310, during traffic channel establishment, PDSN 40 compares the MNID of the mobile to those for which it has active sessions and determines that it has an active session for the mobile node 68. As previously described, the data session record may be created when the mobile device 68 was authenticated and giving services through the micro network 30. At step 315, PDSN 40 changes the logical link for the mobile node 68 from the PCF 72 of the micro network 30 to the PCF 72 of the requesting BSC 42.

Next, at step 320, PDSN 40 continues and complete normal macro session establishment procedures. However, because the IP address assigned to the mobile node 68 is valid, during the IPCP negotiation the mobile node 68 is expected not to receive a new IP address. In this way, a data or other session may be seamlessly or otherwise handed-off from the micro network 30 to the macro network 20.

FIG. 5 illustrates a method for handover of an active session from the macro network 20 to the micro network 30 in accordance with one embodiment of the present invention. In this embodiment, the RAN 43 of the macro network 20 and the micro network 30 each communicate with the PDSN 40 through PCF 72.

Referring to FIG. 5, the method begins at step 400 in which a handover condition is detected. As previously described, a handover condition may be detected by the mobile node 68 when the signal strength with the BTS 66 of the macro network 20 is outside of a specified limit and/or when signal strength with an access point of the micro network 20 is within a limit. Next, at step 405, the mobile node 68 initiates session establishment with the micro network 30. In a particular embodiment, the mobile node 68 includes an access card and initiates session establishment using 802.11b protocols.

Proceeding to step 410, the micro network 30 requests authentication of the mobile node 68 and/or user through PDSN 40 of the macro network 20. As previously described, authentication and other services are provided through PCF 72 of router 76.

At decisional step 415, PDSN 40 determines whether it has an active session with the mobile node 68. In one embodiment, PDSN 40 may store session records for each active session of the macro and micro networks 20 and 30 and may check the session records based on the MNID of the mobile node 68. In addition, if PDSN 40 is part of a PDSN cluster including a plurality of connected PDSN nodes, the PDSN 40 receiving the authentication request may check with the PDSNs in the cluster to determine if an active session exists.

If PDSN 40 determines that it has an active session for the mobile node 68 or a PDSN 40 in the cluster has an active session, the Yes branch of decisional step 415 leads to step 420. At step 420, the virtual path of the active session is re-anchored or changed from the macro network BSC 42 to the micro network access point 78. Thus, traffic for the session will now travel from PDSN 40 to the access point 78 of the micro network 30 through PCF 72 of router 76. At step 425, establishment of the session in the micro network 68 is completed using standardized functionality.

Returning to decisional step 415, if an active session does not exist or cannot be determined, the No branch of decisional step 415 leads to step 430. At step 430, a new session is established for the mobile node 68 with the micro network 30 using standardized protocols. At step 435 the previous session between the mobile node 68 and the macro network 20 is timed out and released. Step 435 as well as step 425 lead to the end of the process by which a call initiated in the macro network 20 may be handed off to the micro network 30. This may reduce loading on the macro network 20 for a given number of subscribers and thereby allow the macro network 20 to handle an increased number of subscribers and the network operator to increase revenues.

Although the present invention has been described with several embodiments, various changes and modifications may be suggested to one skilled in the art. It is intended that the present invention encompass such changes and modifications as falls within the scope of the appended claims.

What is claimed is:

1. A wireless communication system, comprising:
    a macro wireless network comprising a radio access network and a service node, the radio access network operable to communicate information for a wireless session to the service node via a first interface of a type, wherein the first interface is provided in a router that is associated with the service node and that is operable to provide an authentication, authorization, and accounting (AAA) function for one or more access points, whereby the access points communicate AAA commands to the router to achieve respective authentications; and
    a micro wireless network coupled to the service node of the macro wireless network, the micro wireless network operable to communicate information for a wireless session to the service node via a second interface of the same type as the first interface;
    the service node of the macro wireless network operable to:
        receive via the second interface a request to authenticate the handover of a particular wireless session from the macro wireless network to the micro wireless network; and
        manage the authentication of the particular wireless session such that the particular wireless session may be handed over from the macro wireless network to the micro wireless network.

2. The wireless communication system of claim 1, wherein the first and second interfaces comprise a packet control function.

3. The wireless communication system of claim 1, wherein the micro wireless network comprises a wireless local access network (WLAN).

4. The wireless communication system of claim 1, wherein the macro wireless network comprises a code division multiple access (CDMA) wireless network.

5. The wireless communication system of claim 1, wherein the service node comprises a packet data serving node (PDSN).

6. A method for providing services to a communication session anchored to a micro wireless network, comprising:
    providing at a router of the micro wireless network an interface for communication with a service node of a macro wireless network coupled to the micro wireless network, the interface of a same type as used by a radio access network of the macro wireless network to communicate with the service node, wherein the interface is provided in the router that is associated with the service node and that is operable to provide an authentication, authorization, and accounting (AAA) function for one or more access points, whereby the access points communicate AAA commands to the router to achieve respective authentications;
    communicating information associated with the session between the interface and the service node in a format used by the service node to communicate with the radio access network of the macro wireless network; and
    providing macro network services to the session of the micro wireless network through the interface.

7. The method of claim 6, wherein the macro network services comprise locations or services.

8. The method of claim 6, wherein the macro network services comprise push services.

9. The method of claim 6, wherein the macro network services comprise traffic management services.

10. The method of claim 6, wherein the macro network services comprise handoff services.

11. A system for providing services to a communication session anchored to a micro wireless network, comprising:
means for providing at a router of the micro wireless network an interface for communication with a service node of a macro wireless network coupled to the micro wireless network, the interface of a same type as used by a radio access network of the macro wireless network to communicate with the service node, wherein the interface is provided in the router that is associated with the service node and that is operable to provide an authentication, authorization, and accounting (AAA) function for one or more access points, whereby the access points communicate AAA commands to the router to achieve respective authentications;
means for communicating information associated with the session between the interface and the service node in a format used by the service node to communicate with the radio access network of the macro wireless network; and
providing macro network services to the session of the micro wireless network through the interface.

12. The system of claim 11, wherein the macro network services comprise locations or services.

13. The system of claim 11, wherein the macro network services comprise push services.

14. The system of claim 11, wherein the macro network services comprise traffic management services.

15. The system of claim 11, wherein the macro network services comprise handoff services.

16. A system for providing services to a communication session anchored to a micro wireless network, comprising:
logic encoded in media; and
the logic operable to provide at a router of the micro wireless network an interface for communication with a service node of a macro wireless network coupled to the micro wireless network, the interface of a same type as used by a radio access network of the macro wireless network to communicate with the service node, to communicate information associated with the session between the interface and the service node in a format used by the service node to communicate with the radio access network of the macro wireless network and to provide macro network services to the session of the micro wireless network through the interface, wherein the interface is provided in the router that is associated with the service node and that is operable to provide an authentication, authorization, and accounting (AAA) function for one or more access points, whereby the access points communicate AAA commands to the router to achieve respective authentications.

17. The system of claim 16, wherein the macro network services comprise locations or services.

18. The system of claim 16, wherein the macro network services comprise push services.

19. The system of claim 16, wherein the macro network services comprise traffic management services.

20. The system of claim 16, wherein the macro network services comprise handoff services.

* * * * *